US012577396B2

(12) United States Patent
Hong

(10) Patent No.: US 12,577,396 B2
(45) Date of Patent: Mar. 17, 2026

(54) CARBON REDUCTION TYPE THERMOPLASTIC POLYURETHANE ELASTOMER COMPOSITION AND METHOD FOR PREPARING SAME

(71) Applicants: Hyundai Motor Company, Seoul (KR); Kia Corporation, Seoul (KR)

(72) Inventor: Chae Hwan Hong, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 670 days.

(21) Appl. No.: 17/990,437

(22) Filed: Nov. 18, 2022

(65) Prior Publication Data

US 2024/0002660 A1 Jan. 4, 2024

(30) Foreign Application Priority Data

Jun. 29, 2022 (KR) ........................ 10-2022-0079585

(51) Int. Cl.

| | |
|---|---|
| ***C08L 75/08*** | (2006.01) |
| ***C08G 18/10*** | (2006.01) |
| ***C08G 18/32*** | (2006.01) |
| ***C08G 18/44*** | (2006.01) |
| ***C08G 18/48*** | (2006.01) |
| ***C08G 64/34*** | (2006.01) |

(52) U.S. Cl.
CPC .............. *C08L 75/08* (2013.01); *C08G 18/10* (2013.01); *C08G 18/3206* (2013.01); *C08G 18/44* (2013.01); *C08G 18/48* (2013.01); *C08G 64/34* (2013.01); *C08G 2261/12* (2013.01)

(58) Field of Classification Search
CPC ..... C08L 75/08; C08G 18/12; C08G 18/3206; C08G 18/44; C08G 18/48; C08G 64/34; C08G 2261/12; C08G 18/4887; C08G 18/10
See application file for complete search history.

(56) References Cited

U.S. PATENT DOCUMENTS

| | | | | |
|---|---|---|---|---|
| 9,260,562 | B2 | 2/2016 | Müller et al. | |
| 12,180,393 | B2 * | 12/2024 | Hong | C08G 18/4854 |
| 2007/0010643 | A1 | 1/2007 | Nefzger et al. | |
| 2015/0284501 | A1 * | 10/2015 | Wamprecht | C08G 2/12 528/58 |
| 2016/0177046 | A1 | 6/2016 | Torres et al. | |
| 2020/0407485 | A1 | 12/2020 | Hilken et al. | |

FOREIGN PATENT DOCUMENTS

| | | | |
|---|---|---|---|
| JP | 2002-234929 | A | 8/2002 |
| JP | 2014-145083 | A | 8/2014 |
| KR | 2020-0100777 | A | 8/2020 |
| KR | 102395785 | B1 | 5/2022 |

OTHER PUBLICATIONS

JP2002234929 Espacenet Translation (Year: 2002).*
Harris et al., "Polyurethane Elastomers Based on Molecular Weight Advanced Poly (ethylene Ether Carbonate) Diols. I. Comparison to Commercial Diols" Journal of Applied Polymer Science, 41:487-507, 1990.

* cited by examiner

*Primary Examiner* — Marc S Zimmer
*Assistant Examiner* — Virginia L Stonehocker
(74) *Attorney, Agent, or Firm* — Fox Rothschild LLP

(57) ABSTRACT

Disclosed are a polyurethane elastomer composition and a method for preparing the same. The polyurethane elastomer composition may have excellent low-temperature property performance and include a polyether carbonate polyol, an isocyanate compound, and a chain extender.

18 Claims, 1 Drawing Sheet

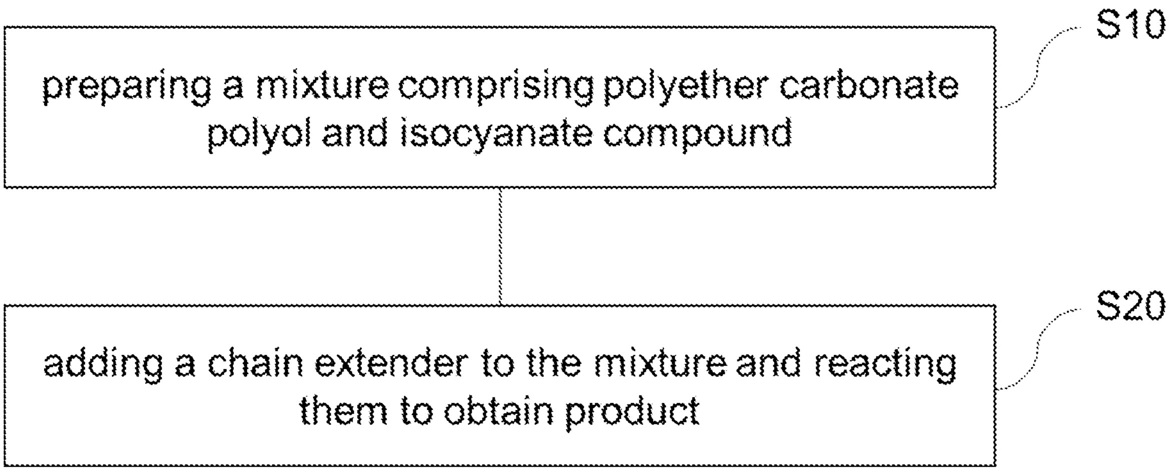
S10
preparing a mixture comprising polyether carbonate polyol and isocyanate compound
S20
adding a chain extender to the mixture and reacting them to obtain product

CARBON REDUCTION TYPE THERMOPLASTIC POLYURETHANE ELASTOMER COMPOSITION AND METHOD FOR PREPARING SAME

CROSS-REFERENCE TO RELATED APPLICATION

This application claims under 35 U.S.C. § 119(a) the benefit of priority to Korean Patent Application No. 10-2022-0079585 filed on Jun. 29, 2022, the entire contents of which are incorporated herein by reference.

TECHNICAL FIELD

The present disclosure relates to a carbon reduction type thermoplastic polyurethane elastomer composition and a method for preparing the same.

BACKGROUND

Thermoplastic polyurethane elastomers used as elastic materials for automobiles have been used as materials for connection portions of various parts. Conventional thermoplastic polyurethane elastomers have generally been manufactured using petroleum-based polyols.

Recently, interest and regulations regarding the low carbonization of petrochemical materials have been increased in automobile industry. For low carbonization of the petrochemical materials, a method of emitting less carbon dioxide or inserting carbon dioxide as a raw material in the process of synthesizing raw materials and polymers has been reported.

Meanwhile, polyurethane was developed by Otto Bayer of Germany in 1937, has various constituents and has excellent reactivity so that it is widely used in various fields. Polyurethane is a polymer compound having a plurality of urethane bonds (—NHCOO—) produced by the combination of a polyol having two or more alcohol groups (—OH) and a polyisocyanate having two or more isocyanate groups (—NCO) in the molecule. Since polyurethane has physical properties such as hardness, thermal stability, and adhesive strength which can be controlled depending on the variation of the type or mixing ratio of raw material, it is very important to discover new materials that become constituents and to derive a mixing technology.

Conventionally, a low carbonization synthesis method of a polyol and an isocyanate compound, which are the main materials of polyurethane, has not been developed so that a low carbonization method of polyurethane adhesives has not been derived.

SUMMARY

In preferred aspects, provided are a polyurethane elastomer composition having excellent low-temperature performance while implementing a carbon reduction effect, and a method for preparing the same.

The objects of the present disclosure are not limited to the object mentioned above. The objects of the present disclosure will become clearer from the following description, and will be realized by means and combinations thereof described in the claims.

In an aspect, provided is a polyurethane elastomer composition including a polyether carbonate polyol, an isocyanate compound, and a chain extender.

A term "isocyanate compound" as sued herein refers to a compound having one or more isocyanate (e.g., —N=C=O) groups, preferably, two or more isocyanate groups. In certain embodiments, the isocyanate compound may have two or more terminal isocyanate group so is represented as O=C=N—R—N=C=O (wherein R is a hydrocarbon, e.g., alkyl, cycloalkyl, or aryl), which is reactive to epoxide and/or polyol.

A term "chain extender" as used herein refers to a compound containing one or more reacting groups (e.g., terminal hydroxyl or amine group) that can preferably react with isocyanate groups. In certain embodiments, the chain extender includes diols or diamines (e.g., low molecular weight diols or diamines) that react with isocyanate, e.g., diisocyanates, to build polyurethane polymers and increase the block length.

The polyether carbonate polyol includes a copolymer obtained from polymerizing a polyether polyol, propylene oxide, and carbon dioxide, and may be represented by [Chemical Formula 1] below.

[Chemical Formula 1]

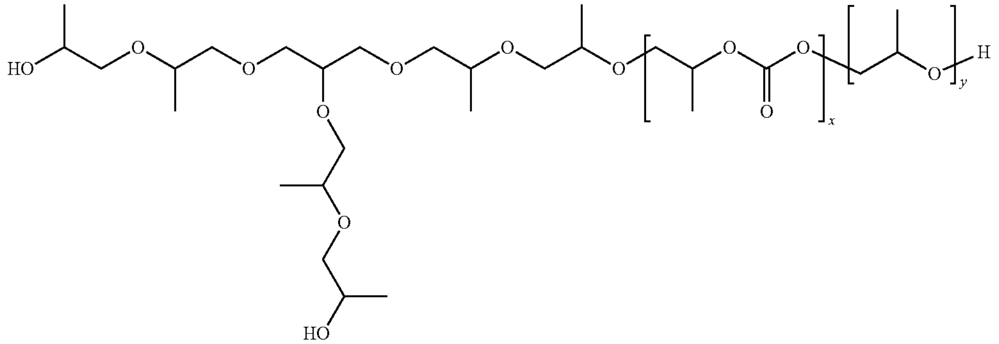

wherein x is an integer of 10 to 20, and y is an integer of 10 to 20.

The polyether carbonate polyol may have a carbonate content of about 5% by weight to 15% by weight based on the total weight of the polyether carbonate polyol.

The polyether carbonate polyol may have a hydroxyl value of about 40 mg KOH/g to 80 mg KOH/g and a weight average molecular weight ($M_w$) of about 1,500 g/mol to 2,500 g/mol.

The isocyanate compound may include one or more selected from the group consisting of diphenylmethane diisocyanate (MDI), toluene diisocyanate (TDI), hexamethylene diisocyanate (HDI), dicyclohexylmethane diisocyanate (H12MI), and isophorone diisocyanate (IPDI).

The isocyanate compound may have a weight average molecular weight ($M_w$) of about 200 g/mol to 300 g/mol.

The polyether carbonate polyol and the isocyanate compound may be contained at a molar ratio of about 1:2 to 3.

The chain extender may include one or more selected from the group consisting of 1,4-butylene glycol, ethylene glycol, diethylene glycol, butane diol, hexane diol, trimethylolpropane, and polytetramethylene ether glycol.

The polyether carbonate polyol and the chain extender may be contained at a molar ratio of about 1:3.4 to 3.6.

The polyether carbonate polyol, the isocyanate, and the chain extender may be contained at a molar ratio of about 1:2 to 3:3.4 to 3.6.

The polyurethane elastomer composition may have a glass transition temperature ($T_g$) of about −20 to −30° C.

In an aspect, provided is a method for preparing a polyurethane elastomer composition may include the steps of preparing an admixture including a polyether carbonate polyol and an isocyanate compound, and reacting the admixture with a chain to obtain a product.

The reacting may be performed at a temperature of about 80 to 90° C.

Also provided is a vehicle part including the polyurethane adhesive composition as described herein. Further, provided is a vehicle including the vehicle part as described herein.

The polyurethane elastomer composition and the method for preparing the same according to various exemplary embodiments of the present disclosure can have excellent low-temperature properties by using a polyether carbonate polyol, an isocyanate compound, and a chain extender in appropriate amounts.

Further, the polyurethane elastomer composition and the method for preparing the same according to various exemplary embodiments of the present disclosure can reduce carbon dioxide by using a polyether carbonate polyol that can implement a carbon reduction effect compared to when using a petroleum-based polyether polyol.

Other aspects of the invention are disclosed infra.

BRIEF DESCRIPTION OF THE DRAWINGS

FIG. 1 shows an exemplary method for preparing an exemplary polyurethane elastomer composition according to an exemplary embodiment of the present disclosure.

DETAILED DESCRIPTION

The above objects, other objects, features and advantages of the present disclosure will be easily understood through the following preferred embodiments related to the accompanying drawings. However, the present disclosure is not limited to the embodiments described herein and may be embodied in other forms. Rather, the embodiments introduced herein are provided so that the disclosed content may become thorough and complete, and the spirit of the present disclosure may be sufficiently conveyed to those skilled in the art.

The similar reference numerals have been used for similar elements while explaining each drawing. In the accompanying drawings, the dimensions of the structures are illustrated after being enlarged than the actual dimensions for clarity of the present disclosure. Terms such as first, second, etc. may be used to describe various components, but the components should not be limited by the terms. The terms are used only for the purpose of distinguishing one component from another component. For example, a first component may be referred to as a second component, and similarly, the second component may also be referred to as the first component, without departing from the scope of rights of the present disclosure. The singular expression includes the plural expression unless the context clearly dictates otherwise.

In the present specification, terms such as “comprise”, “have”, etc. are intended to designate that a feature, number, step, operation, component, part, or a combination thereof described in the specification exists, but it should be understood that the terms do not preclude the possibility of the existence or addition of one or more other features, numbers, steps, operations, components, parts, or combinations thereof. Further, when a part of a layer, film, region, plate, etc. is said to be “on” other part, this includes not only the case where it is “directly on” the other part but also the case where there is another part in the middle thereof. Conversely, when a part of a layer, film, region, plate, etc. is said to be “under” other part, this includes not only the case where it is “directly under” the other part, but also the case where there is another part in the middle thereof.

Unless otherwise specified, since all numbers, values, and/or expressions expressing quantities of components, reaction conditions, polymer compositions and formulations used in the present specification are approximate values reflecting various uncertainties of the measurement that arise in obtaining these values, among others, in which these numbers are essentially different, they should be understood as being modified by the term “about” in all cases. Further, unless specifically stated or obvious from context, as used herein, the term “about” is understood as within a range of normal tolerance in the art, for example within 2 standard deviations of the mean. “About” can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term “about.”

Further, when a numerical range is disclosed in this description, such a range is continuous, and includes all values from a minimum value of such a range to a maximum value including the maximum value, unless otherwise indicated. Furthermore, when such a range refers to an integer, all integers including from a minimum value to a maximum value including the maximum value are included, unless otherwise indicated.

In the present specification, when a range is described for a variable, it will be understood that the variable includes all values including the end points described within the stated range. For example, the range of “5 to 10” will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of “10% to 30%” will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

It is understood that the term “vehicle” or “vehicular” or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Compositions

In an aspect, the disclosure provides a polyurethane elastomer composition that it can be obtained by reacting a polyether carbonate polyol, an isocyanate compound, and a chain extender.

Each component of the polyurethane elastomer composition according to the present disclosure will be described in detail.

(A) Polyether Carbonate Polyol

The polyether carbonate polyol may include a copolymer obtained from polymerization of a polyether polyol, propylene oxide, and carbon dioxide. The polymerized polyol may be used to partially adjust the structure of a soft segment of the final polyurethane elastomer, thereby enabling the vibration transmission properties of the final product to be adjusted.

The polyether carbonate polyol may be represented by [Chemical Formula 1] below.

[Chemical Formula 1]

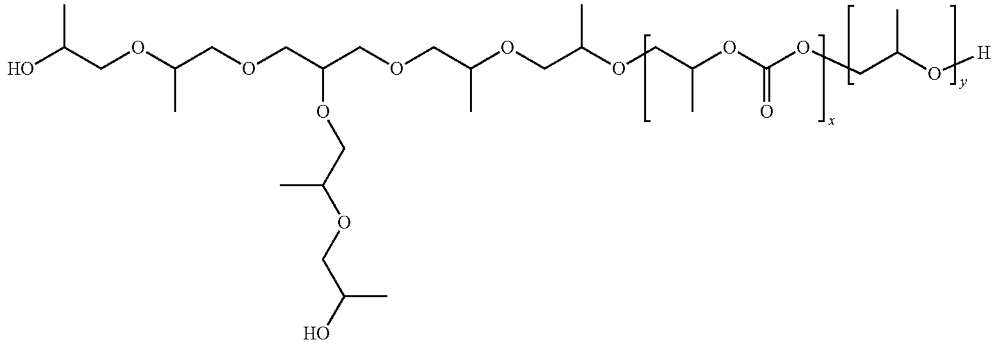

In [Chemical Formula 1], x and y may be appropriately adjusted according to the desired weight average molecular weight of the polyether carbonate polyol. For example, each x and y may be independently an integer belonging to 10 to 20.

The polyether carbonate polyol may be prepared by copolymerizing a polyether polyol, propylene oxide, and carbon dioxide as shown in Chemical Reaction Formula 1 below.

[Chemical Reaction Formula 1]

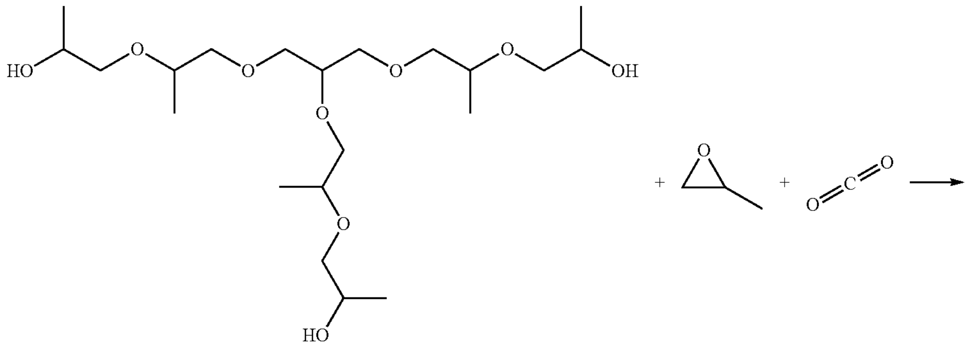

-continued

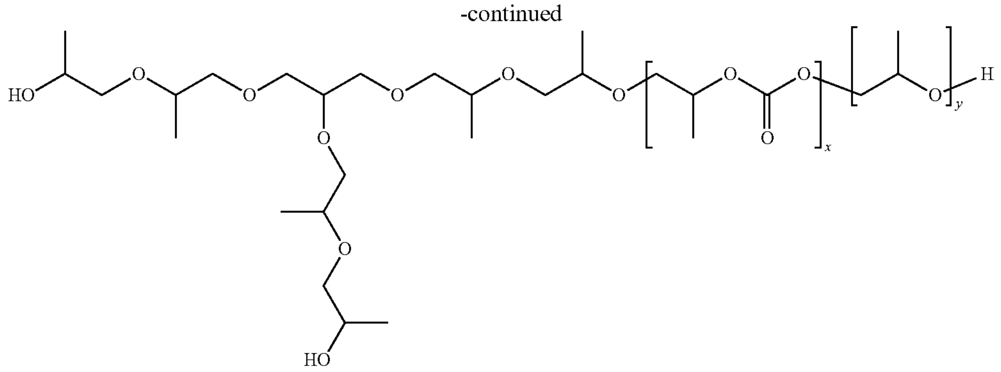

In Chemical Reaction Formula 1, x and y may be appropriately adjusted according to the desired weight average molecular weight of the polyether carbonate polyol. For example, each x and y may independently be an integer from 10 to 20.

In Chemical Reaction Formula 1, a portion of a petroleum-based raw material such as polypropylene oxide or the like is replaced with carbon dioxide ($CO_2$) when synthesizing the polyether carbonate polyol, so as to reduce the cost of feedstock and reduce carbon emission compared to the conventional methods.

Since the polyether carbonate polyol uses carbon dioxide as a raw material, it may contain carbonate. The carbonate means a structure represented by —O—R—O—CO— (where R is an alkyl group having 1 to 3 carbon atoms), and may mean, for example, a repeating unit at the right end of a polyether carbonate polyol of Chemical Formula 1 above.

The polyether carbonate polyol may include an amount of about 5% by weight to 15% by weight of carbonate based on the total weight of the polyether carbonate polyol. At this time, when the carbonate content is less than about 5% by weight, the effect of reducing feedstock cost and carbon emission may be insignificant. In addition, when the carbonate content is greater than about 15% by weight, the intrinsic properties of the polyether carbonate polyol may deteriorate.

The polyether carbonate polyol may be obtained by copolymerizing a polyether polyol, carbon dioxide, and propylene oxide in the presence of a catalyst.

The type of catalyst is not particularly limited, and may include a double metal cyanide catalyst and the like.

The polyether polyol may include one or more selected from the group consisting of a polypropylene glycol block copolymer, a polyethylene glycol block copolymer, a polytetramethylene ether glycol block copolymer, a block copolymer of ethylene oxide and propylene oxide, a butylene oxide polymer, and hyperbranched polyglycidol.

The reaction amounts of the polyether polyol, propylene oxide, and carbon dioxide are not particularly limited, and may be appropriately adjusted depending on the desired weight average molecular weight, stoichiometry, and the like of the polyether polyol, propylene oxide, and carbon dioxide. For example, carbon dioxide may be contained in an amount of about 15% by weight to 25% by weight based on the total weight of the polyether carbonate polyol, and the effect of reducing the use of petrochemical materials in the manufacturing process by about 15% to 25% can be obtained as a result through this.

The polyether polyol may have a hydroxyl value of about 40 mg KOH/g to 80 mg KOH/g. At this time, when the hydroxyl value is less than about 40 mg KOH/g, a problem that the urethane chemical reaction with the isocyanate is not smooth may occur. In addition, even when the hydroxyl value is greater than about 80 mg KOH/g, the problem as described above may occur.

The polyether polyol may have a weight average molecular weight ($M_w$) of about 1,500 g/mol to 2,500 g/mol. At this time, when the weight average molecular weight is less than about 1,500 g/mol, there may be problems in that the mechanical properties of the polyurethane elastomer synthetic product may be reduced, and the balance between the respective physical properties may not be obtained. In addition, even when the weight average molecular weight is greater than 2,500 g/mol, the problem as described above may occur.

(B) Isocyanate Compound

The isocyanate compound may be a component essentially added when manufacturing polyurethane, and has a characteristic of causing a chemical reaction with a polyol.

The isocyanate compound may uniformly distribute the hard segment and the soft segment in the polyurethane structure through the chemical reaction with the polyol. Since the mechanical properties of the polyurethane elastomer composition are improved due to the even distribution of the density, there is no need to use a filler for improving the hardness and rigidity, and thus a cost reduction effect may be obtained.

The isocyanate compound may include one or more selected from the group consisting of diphenylmethane diisocyanate (MDI), toluene diisocyanate (TDI), hexamethylene diisocyanate (HDI), dicyclohexylmethane diisocyanate (H12MI), and isophorone diisocyanate (IPDI). Preferably, it may be diphenylmethane diisocyanate (MDI) represented by [Chemical Formula 2] below.

[Chemical Formula 2]

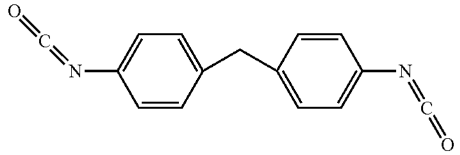

The isocyanate compound may have a weight average molecular weight ($M_w$) of about 200 g/mol to 300 g/mol. At this time, when the weight average molecular weight is less than about 200 g/mol, a problem of lowering the mechanical properties of the final polyurethane synthetic product may occur. In addition, when the weight average molecular weight is greater than about 300 g/mol, there may be a problem of degrading the processability in the part molding step due to an excessive increase in molecular weight of the final polyurethane synthetic product.

The polyether carbonate polyol and the isocyanate compound may be contained at a molar ratio of about 1:2 to 3. At this time, when the molar ratio of the isocyanate compound is less than about 2, a problem of lowering the elastic performance of the final material may occur. In addition, when the molar ratio of the isocyanate compound is greater than about 3, the appropriate viscous/elastic properties required as an elastomer cannot be realized due to excessive chemical reaction and hardness enhancement, and a problem of degrading the low-temperature properties may occur. Here, the low-temperature properties refer to the effect that the temperature at which elasticity is maintained even at low temperatures is further lowered than that of the conventional material. This effect means that even when the environment of the material goes down to cryogenic temperatures, the inherent viscoelastic properties of the material are maintained.

(C) Chain Extender

The chain extender may increase the molecular weight of polyurethane by extending or crosslinking the polyurethane chain.

The chain extender may include one or more selected from the group consisting of 1,4-butylene glycol, ethylene glycol, diethylene glycol, butane diol, hexane diol, trimethylolpropane, and polytetramethylene ether glycol. Preferably, it may be 1,4-butylene glycol represented by [Chemical Formula 3] below.

[Chemical Formula 3]

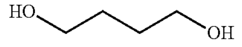

When the low molecular weight chain extender such as 1,4-butylene glycol is reacted with isocyanate, the tendency that isocyanate agglomerates tightly is increased.

The polyether carbonate polyol and the chain extender may be contained at a molar ratio of about 1:3.4 to 3.6. At this time, when the molar ratio of the chain extender is less than about 3.4, the structure of the final material is unstable, and thus the mechanical properties and durability may deteriorate. In addition, when the molar ratio of the chain extender is greater than about 3.6, partial physical property deviations may occur due to excessive crosslinking.

Accordingly, the polyurethane elastomer composition according to the present disclosure may comprise the polyether carbonate polyol, the isocyanate, and a chain extender at a molar ratio of about 1:2 to 3:3.4 to 3.6.

(D) Additive

The additive may impart various functionalities to the polyurethane elastomer composition, and the additive may include one known without any particular limitation in the range that does not impair the effects of the present disclosure.

The additive may include a flame retardant. The flame retardant may include reaction-type flame retardant or an addition-type flame retardant, or include a halogen-based flame retardant, a phosphorus-based flame retardant, and an inorganic flame retardant. In the present disclosure, the type of flame retardant is not limited to a specific flame retardant, and the flame retardant may include one or more selected from the group consisting of a halogen-based flame retardant, a phosphorus-based flame retardant, an inorganic flame retardant, and combinations thereof.

The polyurethane elastomer may be in a form formed by a crosslinking reaction. The crosslinking may refer to a complete chemical bond such as a covalent bond or an ionic bond between the molecules.

Methods of Preparation

In an aspect, the disclosure provides a method for preparing a polyurethane elastomer composition. The polyether carbonate polyol, the isocyanate compound, and the chain extender in the methods described herein are the same as those described above in the polyurethane elastomer composition, and thus detailed descriptions thereof will be omitted.

FIG. 1 shows an exemplary method for preparing a polyurethane elastomer composition according to an exemplary embodiment of the present disclosure. The method for preparing a polyurethane elastomer composition may include steps of preparing an admixture including a polyether carbonate polyol and an isocyanate compound (S10) and reacting the admixture with a chain extender, e.g., by adding a chain extender to the admixture and reacting them to obtain a product (S20).

For example, the step S10 is a step of preparing a mixture comprising a polyether carbonate polyol and an isocyanate compound. Through the step S10, it is possible to uniformly distribute the hard segment and the soft segment in the polyurethane structure by mixing the polyether carbonate polyol and the isocyanate compound. The effect of increasing the physical properties may be achieved due to the even distribution of the internal density of such a composition.

In the step S10, the admixture may comprise the polyether carbonate polyol and the isocyanate compound at a molar ratio of about 1:2 to 3 as described above.

The step S20 is a step of adding a chain extender to the mixture and reacting them to obtain a product.

Through the step S20, the chain extender may obtain a polymer having a large molecular weight by linking the chains of the polymer while forming a urethane group by reacting with the isocyanate compound.

In the step S20, the polyether carbonate polyol, the isocyanate, and the chain extender may be contained at a molar ratio of about 1:2 to 3:3.4 to 3.6 as described above.

In the step S20, it is preferable to obtain a product by performing a reaction at a temperature of about 80 to 90° C. At this time, when the temperature is less than about 80° C., the reaction may not occur well. In addition, when the temperature is greater than about 90° C., the reaction rate is too fast so that uniform mixing may not be achieved.

Finally, the polyurethane elastomer composition prepared by the method for preparing a polyurethane elastomer composition according to the present disclosure may have a density of about 30 $kg/m^3$ to 140 $kg/m^3$.

Meanwhile, the polyurethane elastomer composition is not limited in its field of use, but may be used as an elastic material for automobile part materials. Particularly, it is mounted on the fastening and friction portions of various steel and aluminum materials applied in automobiles to exhibit a high level of viscoelastic performance, and thus can be usefully applied industrially.

EXAMPLE

Hereinafter, the present disclosure will be described in detail with reference to Examples and Comparative Examples below. However, the technical spirit of the present disclosure is not limited or restricted thereto.

Examples 1 to 3

Polyurethane elastomer compositions of Examples 1 to 3 were prepared with the components and contents shown in Table 1 below.

A polyether carbonate polyol and a diphenylmethane diisocyanate (MDI) as an isocyanate compound were mixed at a pressure 1 atm and at a temperature of 30 to 32° C.

Subsequently, 1,4-butylene glycol as a chain extender was added, and the temperature was raised to 80 to 90° C. At this time, Examples 1 to 3 as products were prepared by performing stirring at 100 rpm to 300 rpm using a stirrer.

TABLE 1

| Classification (Unit: molar ratio) | Example 1 | Example 2 | Example 3 |
|---|---|---|---|
| Polyether carbonate polyol | 1 | 1 | 1 |
| Isocyanate compound (diphenylmethane diisocyanate (MDI)) | 2 | 2 | 2 |
| Chain extender (1,4-butylene glycol) | 3.5 | 3.4 | 3.6 |
| Mixing ratio | 1:2:3.5 | 1:2:3.4 | 1:2:3.6 |

Polyether carbonate polyol: It synthesizes itself a compound represented by [Chemical Formula 1] below. X and y of [Chemical Formula 1] are appropriately adjusted according to the weight average molecular weight. It contains carbonate in an amount of 5% by weight to 15% by weight, and has a weight average molecular weight ($M_w$) of 2,000 g/mol and a hydroxyl value of 40 to 80 mg KOH/g.

Isocyanate compound: diphenylmethane diisocyanate (MDI), a product from Sigma-Aldrich Chain extender: 1,4-butylene glycol, a product from Sigma-Aldrich

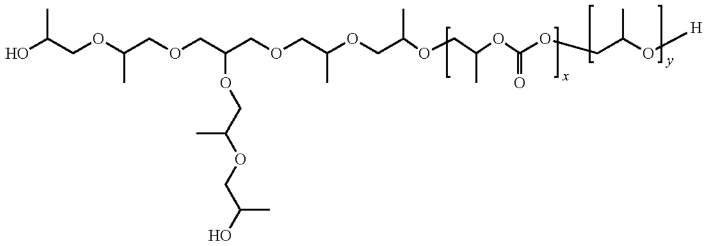

[Chemical Formula 1]

Comparative Examples 1 to 3

Polyurethane elastomer compositions of Comparative Examples 1 to 3 were prepared with the components and contents shown in Table 2 below.

Comparative Examples 1 to 3 were prepared in the same manner as in the Examples 1 to 3 except that a petroleum-based polyether polyol was used instead of the polyether carbonate polyol containing carbonate.

TABLE 2

| Classification (Unit: molar ratio) | Comparative Example 1 | Comparative Example 2 | Comparative Example 3 |
|---|---|---|---|
| Petroleum-based polyether polyol | 1 | 1 | 1 |
| Isocyanate compound (diphenylmethane diisocyanate (MDI)) | 2 | 2 | 2 |
| Chain extender (1,4-butylene glycol) | 3.5 | 3.4 | 3.6 |
| Mixing ratio | 1:2:3.5 | 1:2:3.4 | 1:2:3.6 |

Petroleum-based polyether polyol: It has a carbonate functional group content of 0% by weight, a product from KPX Chemical Isocyanate compound: diphenylmethane diisocyanate (MDI), a product from Sigma-Aldrich Chain extender: 1,4-butylene glycol, a product from Sigma-Aldrich Experimental Example 1: Glass transition temperature comparison experiment Physical properties (glass transition temperature) of polyurethane elastomer compositions according to the Examples and the Comparative Examples were measured by the method as described below for each specimen, and the results are shown in Tables 3 and 4 below.

Evaluation Method

Glass Transition Temperature ($T_g$):

From a comprehensive perspective, glass transition refers to a distinct transformation of a polymer, and refers to a change from a brittle glass-like phase to a rubber-like phase.

The glass transition temperature was measured using a differential scanning calorimeter (DSC). The DSC can know the physical and chemical properties of the sample from the temperature and calorific change data obtained from the compensation energy supplied to a sample and a reference furnace. The intermediate value between the temperature at which the heat flow starts to change and the temperature at which the change ends was determined as the glass transition temperature ($T_g$).

TABLE 3

| Classification | Glass Transition Temperature ($T_g$) |
|---|---|
| Example 1 | −25° C. |
| Example 2 | −26° C. |
| Example 3 | −25° C. |

TABLE 4

| Classification | Glass Transition Temperature ($T_g$) |
|---|---|
| Comparative Example 1 | −2° C. |
| Comparative Example 2 | −1° C. |
| Comparative Example 3 | 0° C. |

As shown in Table 3, Examples 1 to 3 using the polyether carbonate polyol containing carbonate have glass transition temperatures of −25° C., −26° C., and −25° C., respectively. Therefore, the polyurethane elastomer composition according to the exemplary embodiment of the present disclosure had a very high level of low-temperature properties.

Meanwhile, referring to Table 4 above, Comparative Examples 1 to 3 in which the polyether carbonate polyol containing carbonate was not used have glass transition temperatures of −2° C., −1° C., and 0° C., respectively. Through this, the Comparative Examples using the petroleum-based polyether polyol had remarkably less low-temperature properties than the Examples according to the exemplary embodiments of the present disclosure.

Therefore, the polyurethane elastomer composition according to various exemplary embodiments of the present disclosure may have excellent low-temperature property performance by comprising a polyether carbonate polyol, an isocyanate compound, and a chain extender in appropriate amounts.

Hereinabove, although the embodiments of the present disclosure have been described, those of ordinary skill in the art to which the present disclosure pertains will be able to understand that the present disclosure may be embodied in other specific forms without changing the technical spirit or essential features thereof. Therefore, it should be understood that the embodiments described above are illustrative in all respects and not restrictive.

What is claimed is:

1. A polyurethane elastomer composition comprising:

a polyether carbonate polyol;

an isocyanate compound; and a chain extender, wherein the polyether carbonate polyol comprises a copolymer obtained from polymerizing a polyether polyol, propylene oxide, and carbon dioxide, and is represented by [Chemical Formula 1] below,

[Chemical Formula 1]

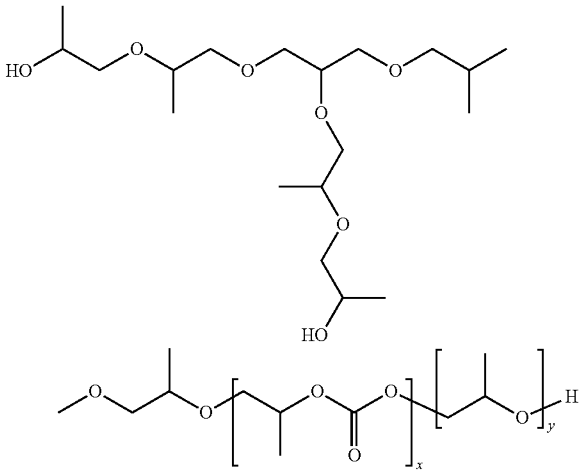

wherein x is an integer of 10 to 20, and y is an integer of 10 to 20, wherein the polyether polyol comprises one or more selected from the group consisting of a polypropylene glycol block copolymer, a polyethylene glycol block copolymer, a polytetramethylene ether glycol block copolymer, a block copolymer of ethylene oxide and propylene oxide, a butylene oxide polymer, and hyperbranched polyglycidol.

2. The polyurethane elastomer composition of claim 1, wherein the polyether carbonate polyol has a carbonate content of about 5% by weight to 15% by weight based on the total weight of the polyether carbonate polyol.

3. The polyurethane elastomer composition of claim 1, wherein the polyether carbonate polyol has a hydroxyl value of about 40 mg KOH/g to 80 mg KOH/g and a weight average molecular weight (Mw) of about 1,500 g/mol to 2,500 g/mol.

4. The polyurethane elastomer composition of claim 1, wherein the isocyanate compound comprises diphenylmethane diisocyanate (MDI), toluene diisocyanate (TDI), hexamethylene diisocyanate (HDI), dicyclohexylmethane diisocyanate (H12MDI), isophorone diisocyanate (IPDI), or combinations thereof.

5. The polyurethane elastomer composition of claim 1, wherein the isocyanate compound has a weight average molecular weight ($M_w$) of about 200 g/mol to 300 g/mol.

6. The polyurethane elastomer composition of claim 1, wherein the polyurethane elastomer composition comprises the polyether carbonate polyol and the isocyanate compound in a molar ratio of about 1:2 to 3.

7. The polyurethane elastomer composition of claim 1, wherein the chain extender comprises 1,4-butylene glycol, ethylene glycol, diethylene glycol, butane diol, hexane diol, trimethylolpropane, polytetramethylene ether glycol, or combinations thereof.

8. The polyurethane elastomer composition of claim 1, wherein the polyurethane elastomer composition comprises the polyether carbonate polyol and the chain extender in a molar ratio of about 1:3.4 to 3.6.

9. The polyurethane elastomer composition of claim 1, wherein the polyurethane elastomer composition comprises the polyether carbonate polyol, the isocyanate, and the chain extender in a molar ratio of about 1:2 to 3:3.4 to 3.6.

10. The polyurethane elastomer composition of claim 1, wherein the polyurethane elastomer composition has a glass transition temperature ($T_g$) of about −20 to −30° C.

11. A method for preparing a polyurethane elastomer composition comprising:

preparing an admixture comprising a polyether carbonate polyol and an isocyanate compound; and reacting the admixture with a chain extender to obtain a product, wherein the polyether carbonate polyol comprises a copolymer obtained from polymerizing a polyether polyol, propylene oxide, and carbon dioxide, and is represented by [Chemical Formula 1] below,

[Chemical Formula 1]

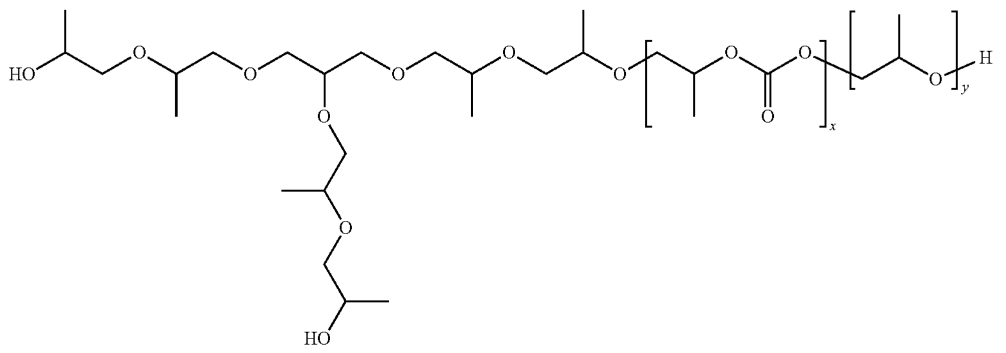

wherein x is an integer of 10 to 20, and y is an integer of 10 to 20, wherein the polyether polyol comprises one or more selected from the group consisting of a polypropylene glycol block copolymer, a polyethylene glycol block copolymer, a polytetramethylene ether glycol block copolymer, a block copolymer of ethylene oxide and propylene oxide, a butylene oxide polymer, and hyperbranched polyglycidol.

12. The method of claim 11, wherein the polyether carbonate polyol has a carbonate content of about 5% by weight to 15% by weight based on the total weight of the polyether carbonate polyol.

13. The method of claim 11, wherein the polyether carbonate polyol has a hydroxyl value of about 40 mg KOH/g to 80 mg KOH/g and a weight average molecular weight ($M_w$) of about 1,500 g/mol to 2,500 g/mol.

14. The method of claim 11, wherein the isocyanate compound comprises diphenylmethane diisocyanate (MDI), toluene diisocyanate (TDI), hexamethylene diisocyanate (HDI), dicyclohexylmethane diisocyanate (H12MDI), isophorone diisocyanate (IPDI), or combinations thereof.

15. The method of claim 11, wherein the chain extender comprises 1,4-butylene glycol, ethylene glycol, diethylene glycol, butane diol, hexane diol, trimethylolpropane, polytetramethylene ether glycol, or combinations thereof.

16. The method of claim 11, wherein the polyurethane elastomer composition comprises the polyether carbonate polyol, the isocyanate, and the chain extender at a molar ratio of about 1:2 to 3:3.4 to 3.6.

17. The method of claim 11, wherein the reacting is performed at a temperature of about 80 to 90° C.

18. The method of claim 11, wherein the polyurethane elastomer composition has a glass transition temperature ($T_g$) of about −20 to −30° C.

* * * * *